United States Patent [19]
Hecht

[11] 3,964,245
[45] June 22, 1976

[54] AIR PICKUP SYSTEM FOR STRAWBERRY PICKERS

[75] Inventor: Charles L. Hecht, Scio, Oreg.
[73] Assignee: S.K.H. & S., Inc., Scio, Oreg.
[22] Filed: Sept. 17, 1974
[21] Appl. No.: 506,898

[52] U.S. Cl. ............................... 56/331; 56/12.9; 56/DIG. 8
[51] Int. Cl.² ......................................... A01D 46/00
[58] Field of Search .......... 56/331, 330, 12.8, 12.9, 56/13.1, 28, 30, 32, 327 R, 327 A, DIG. 8; 171/17

[56] References Cited
UNITED STATES PATENTS

| | | | |
|---|---|---|---|
| 1,733,211 | 10/1929 | Thurman | 56/32 |
| 3,084,496 | 4/1963 | Leonard et al. | 56/327 R |
| 3,178,873 | 4/1965 | Meyer | 56/DIG. 8 |
| 3,183,654 | 5/1965 | Jordan et al. | 56/28 |
| 3,635,005 | 1/1972 | Persson | 56/327 R |
| 3,665,687 | 5/1972 | Hatton | 56/12.9 |

*Primary Examiner*—J.N. Eskovitz
*Attorney, Agent, or Firm*—Clarence A. O'Brien; Harvey B. Jacobson

[57] ABSTRACT

A pickup head for a machine which picks strawberries, and like crops, has a frame moveable along a crop row by a picker chassis on which the frame is mountable. A severing assembly is mounted on the frame for cutting a crop in the crop row from a plant associated with the crop. The crop is lifted into the severing assembly by an arrangement including a duct disposed for directing a gaseous stream beneath the crop and lifting same into communication with the severing assembly for cutting of the crop. The gas is directed under pressure just above the ground so as to put pressure against the crop and thereby bringing the crop into communication with the severing assembly.

10 Claims, 8 Drawing Figures

U.S. Patent  June 22, 1976  Sheet 2 of 3  3,964,245
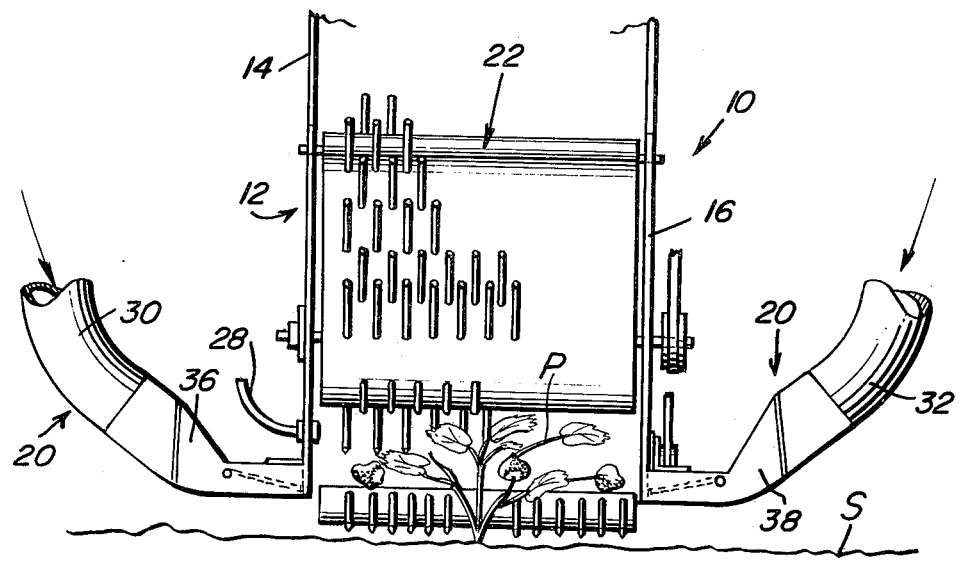
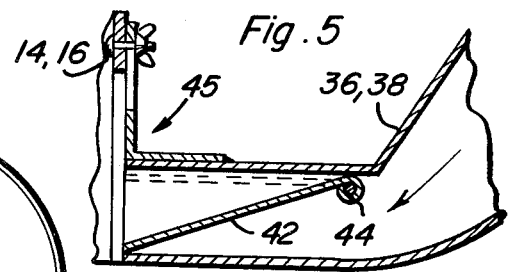
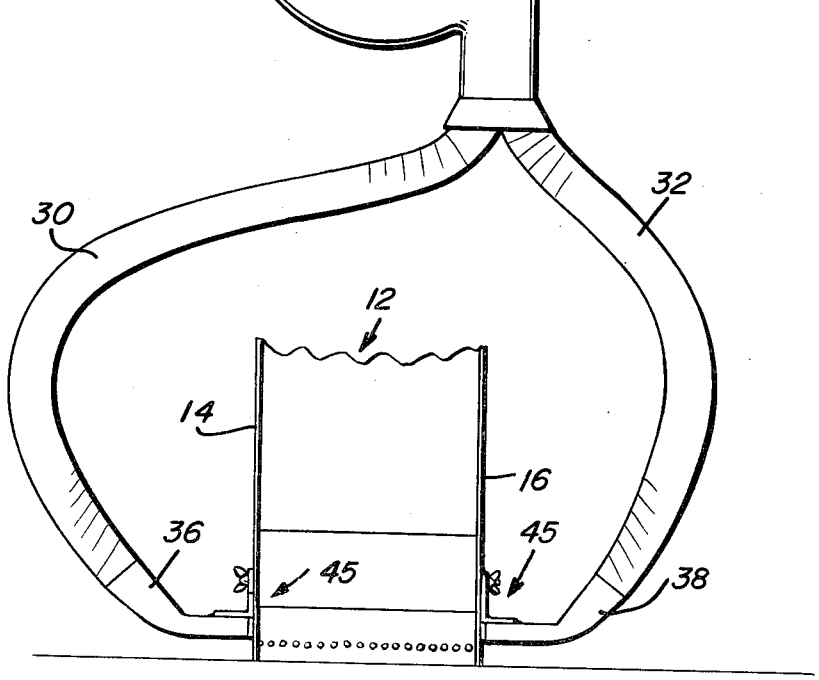

AIR PICKUP SYSTEM FOR STRAWBERRY PICKERS

BACKGROUND OF THE INVENTION

1. Field of the Invention

This invention relates generally to the harvesting of strawberries, and similar crops, and particularly to a pickup head capable of lifting a strawberry plant, and the like, into an upright position for being brought into a severing assembly, as well as to bring strawberry fruit spurs which have grown beyond the outer edge of an associated bed into position for being cut by the severing assembly.

2. Description of the Prior Art

My prior U.S. Pat. No. 3,698,171, issued Oct. 17, 1972, discloses a self-propelled strawberry harvester provided with a plurality of picking fingers which move along close to the ground so as to engage under and lift the berry clusters for a severing thereof from the plant by a sickle bar. As can be readily appreciated, a principal problem encountered in the harvesting of strawberries, and like crops, by mechanical methods involves the lifting of the crop into the sickle bar or other cutting apparatus.

It is known generally to move standing grain backwards by air blasts instead of by using a conventional reel, and the like. See, for example, U.S. Pat. No. 2,710,516, issued Jun. 14, 1955, to T. F. Kaesemeyer, Jr., et al., and U.S. Pat. No. 3,193,995, issued Jul. 13, 1965, to L. J. Miller. There is, however, no lifting effect of any kind obtained from such arrangement, nor is any lifting effect intended. In addition, it is generally known, as shown by U.S. Pat. No. 3,693,331, issued Sept. 26, 1972, to J. E. Richter, et al., to employ air jets to move leaves, twigs, and the like, which have previously been disturbed by an agitating device, and imparting a floating effect to the aforementioned elements until a suction fan discharges them.

U.S. Pat. Nos. 1,900,269, issued Mar. 7, 1933, to H. E. Altgelt, et al., and 3,165,874, issued Jan. 19, 1965, to E. H. Osteen, are also related to use of air blasts to move standing grain back into a harvesting device.

U.S. Pat. No. 3,389,543, issued Jun. 25, 1968, to C. E. Rasmussen and U.S. Pat. No. 3,760,573, issued Sept. 25, 1973, to W. W. Porter, are also believed pertinent to the present invention.

SUMMARY OF THE INVENTION

It is an object of the present invention to provide an improved pickup head for strawberry harvesters, and the like.

It is another object of the present invention to provide a strawberry harvester pickup head which will move the fruit inward and upward so that an associated cutting device and related lever belt can perform their functions with very little damage to the berries.

It is yet another object of the present invention to provide a pickup head adaptable for use with conventional harvesting machines.

These and other objects are achieved according to the present invention by providing a pickup head having: a frame, a severing assembly mounted on the frame for cutting a crop in a crop row from a plant associated with the crop; and a lifting arrangement arranged adjacent the severing assembly for directing a fluid stream beneath the crop and lifting same into communication with the severing assembly for permitting cutting of the crop.

The lifting arrangement advantageously includes two pneumatic ducts arranged for directing a gas under pressure toward a surface associated with the crop. In this manner the gas is deflected upwardly on striking the surface and thereby brings the crop into communication with the severing assembly. Preferably, the pair of pneumatic ducts is each connected to a common fan and terminates in a damper arranged flanking the severing assembly adjacent the supporting surface. Provision of each damper with an adjustable damper permits variation of the amount of gas discharged from the damper.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary, front elevational view showing the pickup head of FIGS. 1 and 2.

FIG. 4 is a fragmentary, schematic diagram showing a preferred layout of a lifting arrangement according to the present invention.

FIG. 5 is a fragmentary, vertial, longitudinal sectional view showing a detail of the pickup head of FIGS. 1 through 3.

DESCRIPTION OF THE PREFERRED EMBODIMENT

Figure 1:
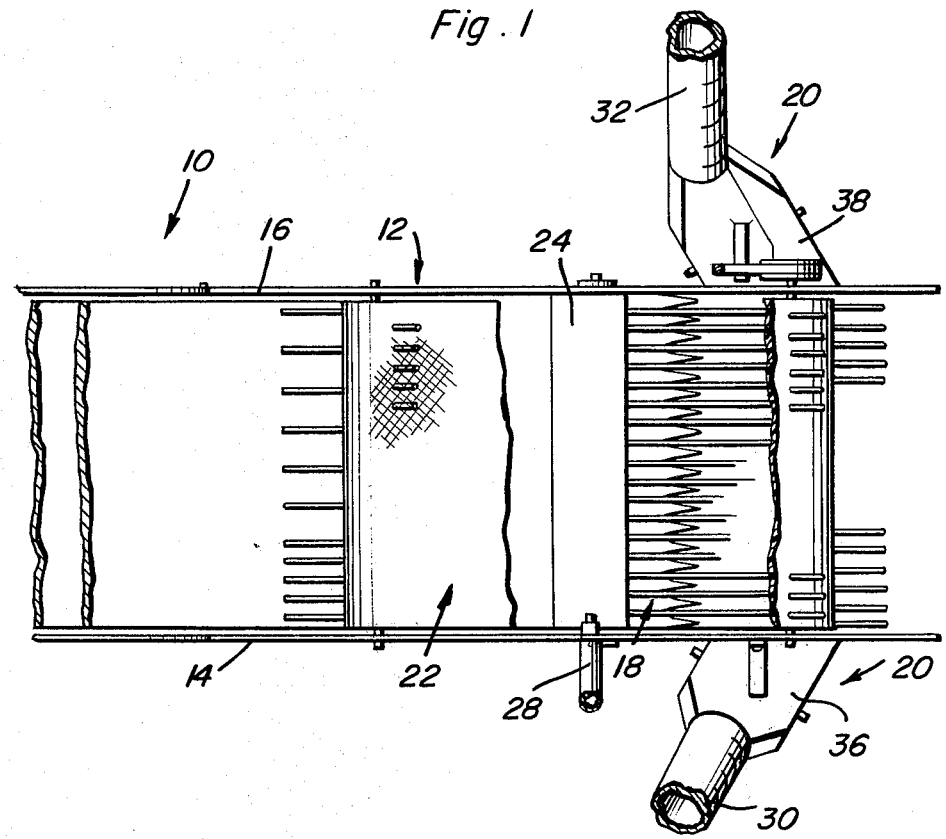
FIG. 1 is a fragmentary, schematic, top plan view showing a pickup head according to the present invention.
Figure 2:
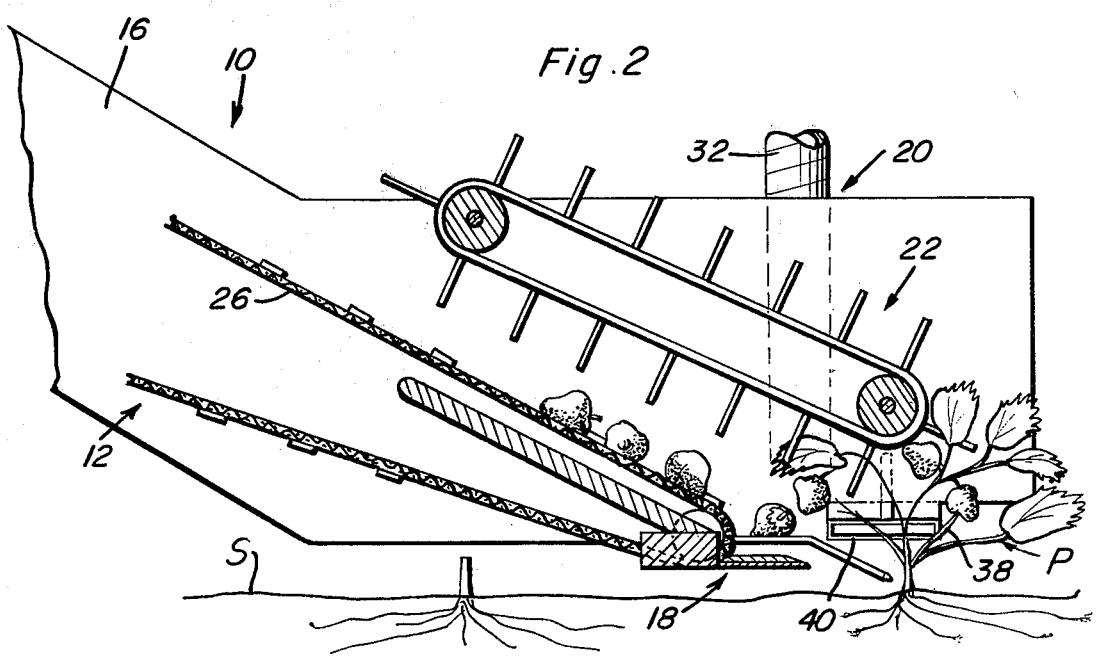
FIG. 2 is a fragmentary, vertical longitudinal sectional view showing the pickup head of FIG. 1.

Referring now more particularly to FIGS. 1 through 3 of the drawings, a pickup head 10 for a machine (not shown) which picks strawberries and like crops has a frame 12 movable along a crop row by a picker chassis (not shown) on which the frame 12 is mountable. The chassis may be similar to that disclosed in my prior U.S. Pat. No. 3,698,171. Frame 12 is basically formed by a pair of substantially planar side plates 14 and 16 connected together by suitable cross members and bracing elements. A severing assembly 18, which may be a conventional sickle bar arrangement, is mounted on frame 12 between side plates 14 and 16 for cutting a crop in a plant row from a plant associated with the crop. Arranged adjacent assembly 18 is a lifting arrangement 20 which directs a fluid stream beneath the crop P and lifts same in communication with assembly 18 for cutting of the crop. A leafer chain 22, transfer plate 24, and a transfer belt 26 are provided on frame 12 between plates 14, 16 to process the cut crop in a manner similar to processing by elements set out in my aforementioned prior U.S. Pat. No. 3,698,171. Since chain 22, plate 24 and belt 26, with the latter two elements being advantageously constructed from stainless steel and the like, do not necessarily form part of the present invention per se, it is not considered necessary to describe them in greater detail herein. A water spray pipe 28 is advantageously arranged extending into frame 12 through side plate 14 for spraying water onto blades forming severing assembly 18 and cleaning same while pickup head 10 is in operation.

Lifting arrangement 20 includes the illustrated pair of ducts 30 and 32 arranged for directing a gas, such as air, under pressure just above a surface S, such as the raised bed, associated with crop P. The gas thereby brings crop P into communication with severing assembly 18. This operation will be described in greater detail below. The ducts 30 and 32 are preferably adjustably arranged for upward and downward movement on the pickup head. FIG. 4 of the drawings shows a preferred layout for the air directing, lifting arrangement according to the present invention. In this layout, a conventional fan 34 feeds air into ducts 30 and 32. The latter are advantageously flexible pneumatic ducts of conventional construction. Each duct 30, 32 terminates in a damper 36, 38, respectively, which is advantageously provided with the rectangular openings 40 illustrated in FIG. 2 for damper 38. It is to be understood that damper 36 may be also provided with such an opening 40, as desired. Further, although the illustrated rectangular opening 40 has been found advantageous for use with ducts 30, 32 and their associated dampers 36, 38, it is to be understood that other suitable configured openings (not shown) may be employed, if so desired.

Referring now to FIG. 5 of the drawings, each damper 36 and 38 is advantageously provided with a damper blade 42 pivotally mounted on a suitable shaft 44. As can be readily appreciated, shaft 44 would be rotatably mounted in the walls of the associated dampers 36, 38. By providing shaft 44 with a suitable handle (not shown) and possibly with a position retaining device (not shown) of conventional construction, damper blade 42 may be positioned in a predetermined manner to adjust or vary, the amount of gas discharged from the damper. In this manner, the blast of air, or other gas, directed just above surface S so as to lift plants P from the surface may be adjusted as advisable for a specific harvesting operation. Slotted brackets 45, and the like, permit upward and downward adjustment of the ducts.

Figure 7:
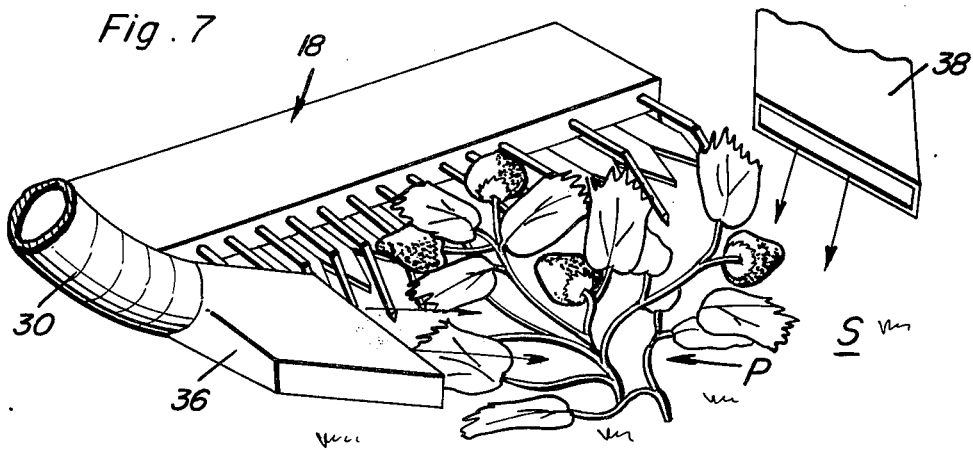
Figure 8:
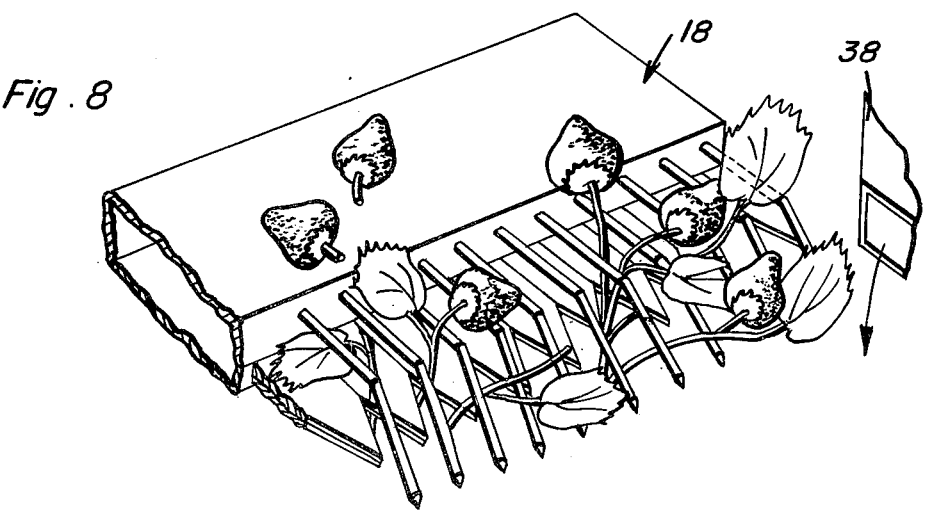

The operation of a pickup head according to the present invention will now be explained in conjunction with FIGS. 6 through 8 of the drawings.

Air pressure produced by fan 34, which may be a conventional radial fan, is split and sent through the two ducts 30 and 32 into the respective dampers 36 and 38 of the ducts. The dampers 36, 38 are located one on each side and above the sickle blade, and the like, forming severing assembly 18. These nozzles or dampers, are arranged pointing at a point immediately in front of the cutting blade. As the pressure passes through the ducts and dampers it creates an action which brings the plant into the required position for cutting. The amount of force applied to the crop is determined by the setting of the damper blades 42.

Figure 6:
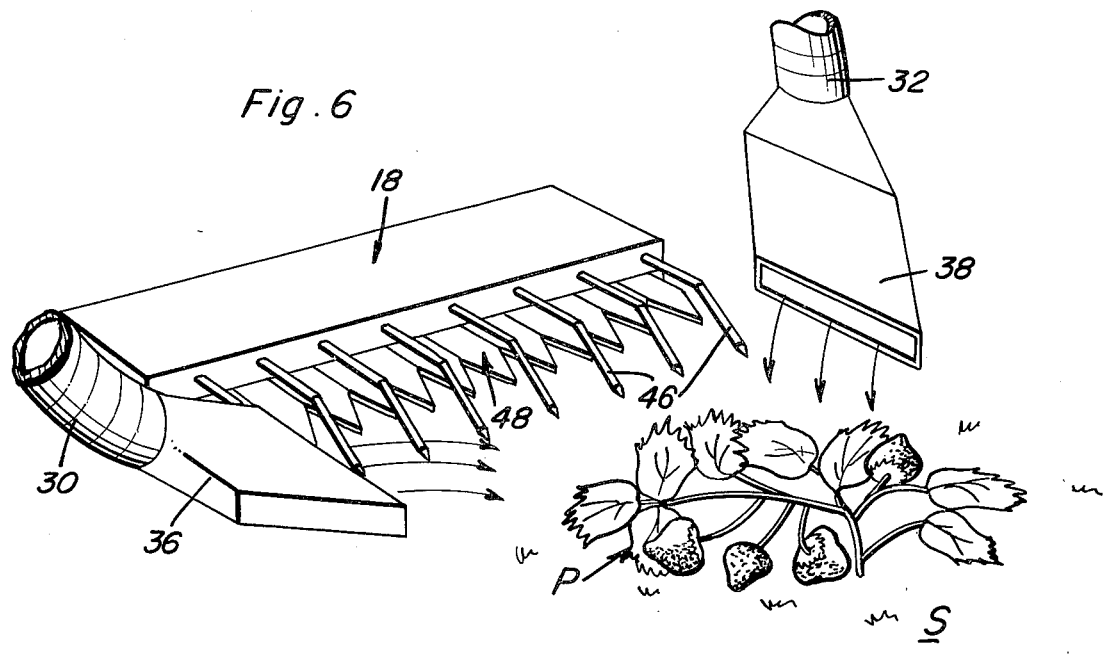
FIGS. 6, 7, and 8 are fragmentary, schematic perspective views showing steps in the operation of a pickup head according to the present invention.

More specifically, when the first portion of air comes into contact with the berries, as shown in FIG. 6, the berries start to move by rolling into the middle of the row. As more of the air contacts the berries, they are lifted and tend to go to the middle of the row. With air coming from both sides of the row with equal force, the fruit is held up for a short period of time allowing the lifting fingers 46 and sickle 48 to slip under the berries, as shown in FIG. 7. Simultaneously with this slipping-under movement, leafer belt or chain 22 acts to move the fruit back over the sickle 48 before it is cut off. See FIG. 2. As the berries and leaves are cut off, the leafer chain 22 continues to help move the berries rearward on transfer belt 26 to an elevator belt (not shown) which transfers the picked berries to a further processing stage of the associated picker. The cutting operation is shown in FIG. 8 of the drawings. The fact that the berries are attached to the plant or the ground serves as an anchor on the end of the fruit spur, so that the fruit must rise with the air instead of moving on down the row. Note FIG. 7. The foliage of the plant also helps to lift the fruit as some berries are above the leaves and also the leaves give the air something to push against, like a sail.

To summarize the operation of the air ducts 30, 32, the nozzle or damper terminating portions of these ducts are arranged substantially horizontal, or at an acute angle, with respect to the ground so that the air blast will be into the crop to be harvested and lift the crop up into the sickle 48 for cutting thereby. For strawberries, sickle 48 is advantageously arranged at, for example, approximately 2 inches above the plant bed.

As will be appreciated from the above description and from the drawings, a pickup head according to the present invention provided with one or more air ducts provides a fruit handling device that facilitates mechanical picking and handling of sensitive fruit, such as strawberries, with a minimum of damage to the fruit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pickup head for a machine which picks strawberries and like crops, comprising, in combination:
    a. a frame movable along a crop row;
    b. severing means mounted on the frame at a predetermined level and adjacent the surface of the ground for cutting a crop in the crop row from a plant associated with the crop; and
    c. lifting means arranged adjacent the severing means for directing a fluid stream beneath the crop at such predetermined level and at right angles to the row of crop for raising the crop into communication with the severing means for cutting off the crop.

2. A structure as defined in claim 1, wherein the lifting means includes two pneumatic ducts arranged directly opposite each other for directing a gas under pressure at right angles to a crop row and toward each other and thereby bringing the crop into communication with the severing means, the ducts being arranged on the pickup head adjustable upward and downward.

3. A structure as defined in claim 2, wherein the lifting means further includes a fan and a pair of flexible pneumatic ducts, each duct terminating in a damper provided with a rectangular opening, the ducts arranged flanking the severing means, with the damper openings disposed adjacent the surface associated with the crop.

4. A structure as defined in claim 3, wherein each damper is provided with a fixedly adjustable damper blade arranged for varying the amount of gas discharged from the damper.

5. In a picker for strawberries and like crops having a pickup head including a frame, severing means mounted on the frame at a predetermined level and adjacent the surface of the ground for cutting the crop, and lifting means provided on the head at said predetermined level for raising the crop and facilitating severing of same, the improvement wherein the lifting means includes two pneumatic ducts arranged for directing a gas under pressure at right angles to a crop row and thereby lifting the crop to the desired position for cutting by the severing means, the ducts being arranged on the head adjustable upward and downward.

6. A structure as defined in claim 5, wherein the lifting means further includes a fan and a pair of flexible pneumatic ducts, each duct terminating in a damper provided with a rectangular opening, the duct arranged flanking the severing means with the damper openings disposed adjacent the surface associated with the crop and toward each other.

7. A structure as defined in claim 6, wherein each damper is provided with a fixedly adjustable damper blade arranged for varying the amount of gas discharged from the damper.

8. In combination with a strawberry harvesting machine having a pickup head with severing means thereon at a predetermined level and adjacent the surface of the ground, a lifting arrangement at said predetermined level for the pickup head of the strawberry harvesting machine, comprising two pneumatic ducts arranged for directing a gas under pressure at right angles to a row of strawberries and toward each other and thereby bringing the strawberries into the desired position for cutting of the stems by the severing means, the ducts being arrangeable on the pickup head for upward and downward adjustment.

9. A structure as defined in claim 8, wherein the lifting arrangement further includes a fan and a pair of flexible pneumatic ducts, each duct terminating in a damper provided with a rectangular opening, the ducts arranged flanking the severing means with the damper openings disposed adjacent the surface associated with the strawberries.

10. A structure as defined in claim 9, wherein each damper is provided with a fixedly adjustable damper blade arranged for varying the amount of gas discharged from the damper.

* * * * *